(12) United States Patent
Lea et al.

(10) Patent No.: US 7,965,298 B2
(45) Date of Patent: Jun. 21, 2011

(54) APPARATUS, METHOD, AND MEDIUM FOR DISPLAYING CONTENT ACCORDING TO MOTION

(75) Inventors: Jong-ho Lea, Seongnam-si (KR); Hee-seob Ryu, Suwon-si (KR); Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 965 days.

(21) Appl. No.: 11/896,108

(22) Filed: Aug. 29, 2007

(65) Prior Publication Data
US 2008/0122737 A1 May 29, 2008

(30) Foreign Application Priority Data
Nov. 28, 2006 (KR) .................. 10-2006-0118633

(51) Int. Cl.
G09G 5/00 (2006.01)
G06T 11/20 (2006.01)
H04N 7/18 (2006.01)
H04N 5/228 (2006.01)
H04N 7/12 (2006.01)
G06K 9/36 (2006.01)
G06K 9/20 (2006.01)
G06K 9/46 (2006.01)

(52) U.S. Cl. ........ 345/581; 345/428; 345/619; 345/652; 345/8; 348/154; 348/208.4; 348/213.13; 348/416.1; 382/254; 382/276; 382/312; 382/236

(58) Field of Classification Search .......... 345/418–419, 345/428, 581, 617–619, 652, 653–654, 629–640, 345/674, 7–9; 348/154, 169, 208.4, 208.13, 348/208.14, 451, 352, 402.1, 407.1, 563, 416.1, 564, 431, 452; 382/254–255, 276, 312, 236, 286, 291, 300
See application file for complete search history.

(56) References Cited

U.S. PATENT DOCUMENTS

| | | | | |
|---|---|---|---|---|
| 5,949,481 | A * | 9/1999 | Sekine et al. ............ | 348/207.99 |
| 6,330,344 | B1 * | 12/2001 | Kondo et al. ............ | 382/107 |
| 2002/0099257 | A1 * | 7/2002 | Parker et al. ............ | 600/27 |
| 2003/0156756 | A1 * | 8/2003 | Gokturk et al. ............ | 382/190 |
| 2005/0002546 | A1 * | 1/2005 | Florent et al. ............ | 382/128 |
| 2006/0008152 | A1 * | 1/2006 | Kumar et al. ............ | 382/190 |

(Continued)

FOREIGN PATENT DOCUMENTS

JP 4-168489 6/1992

(Continued)

OTHER PUBLICATIONS

Korean Office Action issued Feb. 27, 2008 issued in corresponding Korean Patent Application No. 10-2006-0118633.

*Primary Examiner* — Wesner Sajous
(74) *Attorney, Agent, or Firm* — Staas & Halsey LLP (57) ABSTRACT

Provided is an apparatus, a method, and a medium for displaying contents according to motions by identifying the direction of a sensed motion and moving the content region in a direction opposite to the identified direction or moving the background region in the identified direction. The apparatus including a motion sensing unit to sense a motion; a display control unit to adjust a position of an image region with reference to a direction of the sensed motion; and a display unit to display a content and a background according to the adjusted position, wherein the image region comprises a content region having the content and a background region having the background.

25 Claims, 7 Drawing Sheets

U.S. PATENT DOCUMENTS

| | | | |
|---|---|---|---|
| 2008/0030360 A1* | 2/2008 | Griffin | 340/689 |
| 2008/0109724 A1* | 5/2008 | Gallmeier et al. | 715/716 |
| 2008/0259169 A1* | 10/2008 | Nagano et al. | 348/208.4 |
| 2010/0054592 A1* | 3/2010 | Nanu et al. | 382/167 |
| 2010/0165129 A1* | 7/2010 | Kondo et al. | 348/208.4 |

FOREIGN PATENT DOCUMENTS

| | | |
|---|---|---|
| JP | 7298165 | 11/1995 |
| JP | 2003-279882 | 10/2003 |
| KR | 10-0283526 | 12/2000 |

* cited by examiner

APPARATUS, METHOD, AND MEDIUM FOR DISPLAYING CONTENT ACCORDING TO MOTION

CROSS-REFERENCE TO RELATED APPLICATIONS

This application claims priority benefit from Korean Patent Application No. 10-2006-0118633 filed on Nov. 28, 2006 in the Korean Intellectual Property Office, the disclosure of which is incorporated herein by reference in its entirety.

BACKGROUND

1. Field

Embodiments generally to an apparatus, a method, and a medium for displaying contents according to motions. More particularly, embodiments relate to an apparatus, a method, and a medium for displaying contents according to motions by identifying the direction of a sensed motion and moving the content region in a direction opposite to the identified direction or moving the background region in the identified direction.

2. Description of the Related Art

As generally known in the art, development of integration technology has caused the appearance of various portable devices, including sound regeneration devices (e.g. tape regeneration devices, CD players), wireless pagers, portable telephones, MP3 players, personal digital assistants (PDAs), and portable game consoles.

Particularly, portable telephones not only function as a conventional communication, but also play the role of watches, digital cameras, and MP3 players.

Devices for communication between computers and humans in mobile environments include an HDM (Head Mounted Display), an eyeglass-type display, a PMP (Personal Media Player), a compact liquid crystal screen of a portable telephone, a compact display mounted on the rear side of a seat in an airplane, and an UMPC (Ultra Mobile Personal Computer). The HMD, in particular, transmits data regarding the change of position, which occurs when the user's head moves, to a computer so that the computer can calculate the size and depth of an object, which is supposed to exist in the user's field of view, and simulate it.

The eyeglass-type display is similar to the HMD, which is fastened to the user's head and displays contents, and has an ultra-compact LCD on the eyeglasses so that the user can watch images larger than actually displayed images.

When the user of an HMD, an eyeglass-type display, or a portable display device gazes at it for a long period of time, he may feel dizzy as a result of a VOR (Vestibulo-Ocular Reflex). As used herein, the VOR refers to a reflex motion of the user's viewpoint in a direction opposite to a movement of the user resulting from vibration, for example. More particularly, when a passenger in a bus is moved upwards due to vibration of the bus, his viewpoint, which has been directed forwards, is instantly moved downwards in order to continuously gaze forwards.

Such dizziness resulting from a VOR is exaggerated if displayed images are close to the user's eyes, if he tries to clearly watch vibrating images for an extended period of time, or if the amplitude of vibration is large.

The user may adapt his visual reactions to vibrating images by gazing at the vibrating images persistently. Accordingly, after gazing at vibrating images for a long period of time, the VOR is suppressed. As a result, the user is less affected by motions and feels less dizzy. However, when the user finishes gazing at vibrating images, the previous adaptation of his visual reactions to vibrating images may make it difficult to quickly adapt himself/herself to normal environments, in which he must compensate for the discrepancy between his motion and that of images. As a result, the user may feel dizzy again.

Considering the fact that the user may feel dizzy not only when he begins to gaze at vibrating images, but also when he finishes gazing at them, it is requested to provide a method, apparatus, and medium for displaying images without disturbing the VOR.

SUMMARY

Accordingly, embodiments solve the above-mentioned problems occurring in the prior art, and aspects of embodiments provide an apparatus, a method, and a medium for displaying contents according to motions by identifying the direction of a sensed motion and moving the content region in a direction opposite to the identified direction.

Aspects of embodiments further provide an apparatus, a method, and a medium for displaying contents according to motions by identifying the direction of a sensed motion and moving the background region in the identified direction.

In an aspect of embodiments, there is provided an apparatus for displaying an image according to a motion, the apparatus including a motion sensing unit to sense a motion; a display control unit to adjust a position of an image region with reference to a direction of the sensed motion; and a display unit to display a content and a background according to the adjusted position, wherein the image region comprises a content region having the content and a background region having the background.

In an aspect of embodiments, there is also provided a method of displaying an image according to a motion, the method including sensing a motion; adjusting a position of an image region comprising the image with reference to a direction of the sensed motion; and displaying a content and a background according to the adjusted position, wherein the image region comprises a content region having the content and a background region having the background.

In an aspect of embodiments, there is provided an apparatus for displaying an image according to a motion, the apparatus including: a display controller to adjust a position of an image region including the image with reference to a direction of sensed motion of the apparatus for displaying the image; and a display to display a content and a background according to the adjusted position, wherein the image region comprises a content region having the content and a background region having the background.

According to another aspect, there is provided at least one computer readable medium storing computer readable instructions to implement methods of embodiments.

BRIEF DESCRIPTION OF THE DRAWINGS

These and/or other aspects, features and advantages will become apparent and more readily appreciated from the following description of exemplary embodiments, taken in conjunction with the accompanying drawings of which.

DETAILED DESCRIPTION OF EMBODIMENTS

Reference will now be made in detail to exemplary embodiments, examples of which are illustrated in the accompanying drawings, wherein like reference numerals refer to the like elements throughout. Exemplary embodiments are described below by referring to the figures.

Figure 1:
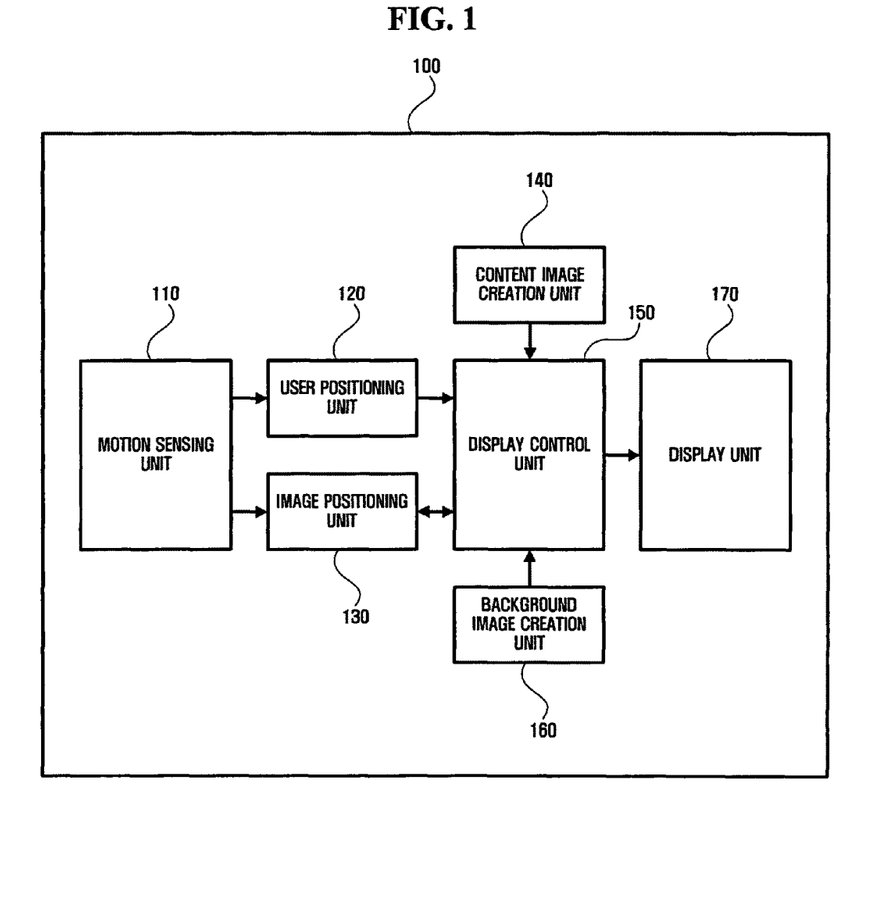
FIG. 1 is a block diagram showing an apparatus for displaying contents based on motions according to an exemplary embodiment.

FIG. 1 is a block diagram showing an apparatus for displaying contents based on motions according to an exemplary embodiment. The apparatus for displaying contents based on motions (hereinafter, referred to as content display apparatus) 100 includes a motion sensing unit 110 (motion sensor), a user positioning unit 120, an image positioning unit 130, a content image creation unit 140, a display control unit 150 (display controller), a background image creation unit 160, and a display unit 170 (display).

The motion sensing unit 110 is adapted to sense the motion of the content display apparatus 100. As used herein, the motion may refer to a horizontal motion along one or a combination of three axes in a three-dimensional space. Alternatively, the motion may refer to a circular motion about one or a combination of three axes in three-dimensional space.

The sensed motion may correspond to acceleration or angular velocity in terms of physics. Particularly, the motion sensing unit 110 may be an acceleration sensor for measuring the amount of acceleration or an angular velocity sensor for measuring the amount of angular velocity. In order to sense horizontal or circular motions in a three-dimensional space, the motion sensing unit 110 may be a combination of at least one acceleration sensor and angular velocity sensor.

The user positioning unit 120 is adapted to position the user, particularly his head or eyes, with reference to a motion sensed by the motion sensing unit 110. This may be based on the size of the sensed motion and the sensing time. For example, if the content display apparatus 100 is an HMD or an eyeglass-type display, the size and time of a motion sensed by the sensing unit 110 are similar to those of the actual motion of the user's head. In contrast, if the content display apparatus 100 is a portable terminal (e.g. a PMP or a portable telephone), there is a discrepancy between the size and time of a motion sensed by the motion sensing unit 110 and those of the actual motion of the user's head. Therefore, the user positioning unit 120 positions the user based on the type of the content display apparatus 100 and information from the motion sensing unit 110.

The image positioning unit 130 is adapted to position an image region, which is currently displayed, with reference to a motion sensed by the motion sensing unit 110. The image region may include a content region, in which a content image is displayed, and a background region, in which a background image is displayed.

According to the present exemplary embodiment, the content or background region changes its position as the content display apparatus 100 moves. Then, the image positioning unit 130 identifies the changed position and transmits corresponding information to the display control unit 150.

The content image creation unit 140 and the background image creation unit 160 are adapted to create content and background images, respectively. As used herein, the content image refers to image information related to various functions (operations) incorporated by the content display apparatus 100, including games, still images, moving images, and characters. The background image refers to an image pre-stored in the content display apparatus 100 and displayed in the background region, in order to distinguish the background region from the content region, which is included therein, and reflect the user's motion in the background image so that the motion of the content region is compensated for.

According to the present exemplary embodiment, the background region changes its position as the content display apparatus 100 moves, in order to lessen the user's dizziness resulting from a VOR, as will be described later in more detail with reference to FIG. 5.

The display control unit 150 is adapted to adjust the position of the image region with reference to the direction of a motion sensed by the motion sensing unit 110. The adjustment of position of the image region is based on the deviation of time of movement and change of the user and the image region identified by the user positioning unit 120 and the image positioning unit 130, respectively, from the time at which a motion sensed by the motion sensing unit 110 has occurred. Particularly, upon identifying the changed position of the user, the user positioning unit 120 checks the time of change, and, upon identifying the changed position of the image region, the image positioning unit 130 checks the time of change. As such, based on information from the user positioning unit 120 and the image positioning unit 130, the display control unit 150 changes the position of the image region.

The display control unit 150 adjusts the position of the content region in a direction opposite to the direction of a motion sensed by the motion sensing unit 110 or adjusts the position of the background in the direction of the sensed motion. Alternatively, the display control unit 150 may adjust the position of the content region and the background simultaneously.

As mentioned above, the image region includes content and background regions. The background region may be larger than the content region so that the entire content region is displayed within the background region. In an exemplary embodiment, it is to be understood that, when the content region changes its position, the content region moves relative to the background region while the latter remains stationary.

The content and background regions may be realized by different physical display units, and a vibrator may change the position of the content region. Alternatively, the content and background regions may be realized by a single physical display unit, and the position change of the content region may be implemented on a software basis. For example, the content and background regions constitute different layers so that the content region layer, which exists above the background region layer, changes its position.

In addition, the display control unit 150 can adjust the color, brightness, and update rate of the image region with reference to the size and rate of a motion sensed by the motion sensing unit 110. As used herein, the update rate refers to a frame cycle at which the image region, which has changed its position, is displayed.

The display unit 170 is adapted to display contents and backgrounds, which are included in the image region with reference to the position adjusted by the display control unit 150. In order to display inputted image signals, the display unit 170 has an image display unit selected from a CRT (Cathode Ray Tube), an LCD (Liquid Crystal Display), an LED (Light Emitting Diode), an OLED (Organic Light Emitting Diode), and a PDP (Plasma Display Panel). As such, the display unit 170 acts as a module for displaying transmitted color information.

The display unit 170 may include at least one of the above-mentioned display units.

Figure 2:
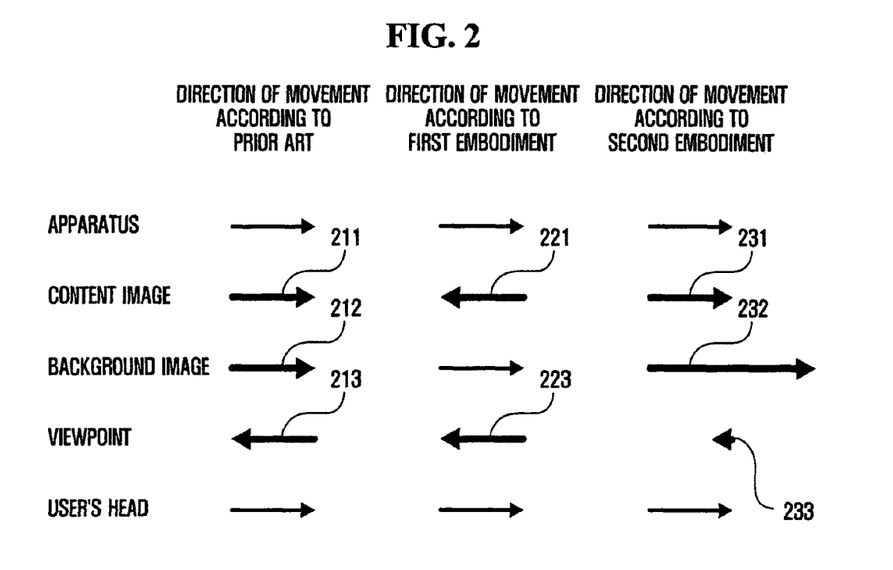
FIG. 2 shows the direction of movement of images and viewpoints for a comparison between the prior art and exemplary embodiments.

FIG. 2 shows the direction of movement of images and viewpoints for a comparison between the prior art and exemplary embodiments, including one exemplary embodiment and another exemplary embodiments. In the case of one exemplary embodiment, the content region changes its position, and, in the case of another exemplary embodiment, the background changes its position.

When the content display apparatus 100 moves from left to right according to the prior art, the content image, the background image, and the user's head move in the same direction (i.e. from left to right). However, the user's viewpoint moves from right to left in an attempt to keep focusing in the forward direction (i.e. due to a VOR). In other words, the direction of movement of the user's viewpoint 213 is opposite to that of the content image and the background image 211 and 212. If such a discrepancy in direction occurs frequently, the user feels dizzy.

When the content display apparatus 100 moves from left to right according to one exemplary embodiment, the display control unit 150 moves the content image from right to left. Accordingly, the content region is moved from right to left by the display control unit 150. The background image, which remains stationary with regard to the content display apparatus 100, moves from left to right together with the content display apparatus 100. The background image and the user's head also move from left to right, and the user's viewpoint moves from right to left.

In summary, the direction of movement of the content image 221 is the same as that of the user's viewpoint 223 so that the user can gaze at the content image with little vibration.

When the content display apparatus 100 moves from left to right according to the another exemplary embodiment, the content image and the user's head move in the same direction as the content display apparatus 100 (i.e. from left to right). The direction of movement of the background image 232 is the same as that of the content image 231 (i.e. from left to right). In addition, the display control unit 150 further moves the background image in the same direction so that the total distance of movement of the background image is larger than that of the content display apparatus 100, the content image, and the user's head. Since the background image moves further than the content image, it appears to the user's eyes that the direction of movement of the content image 231, which is included in the background image, is from right to left. As a result, the user undergoes a lesser VOR, i.e. the movement of viewpoint 233 decreases. Accordingly, the user feels less dizzy than in the case of the prior art.

Figure 3:
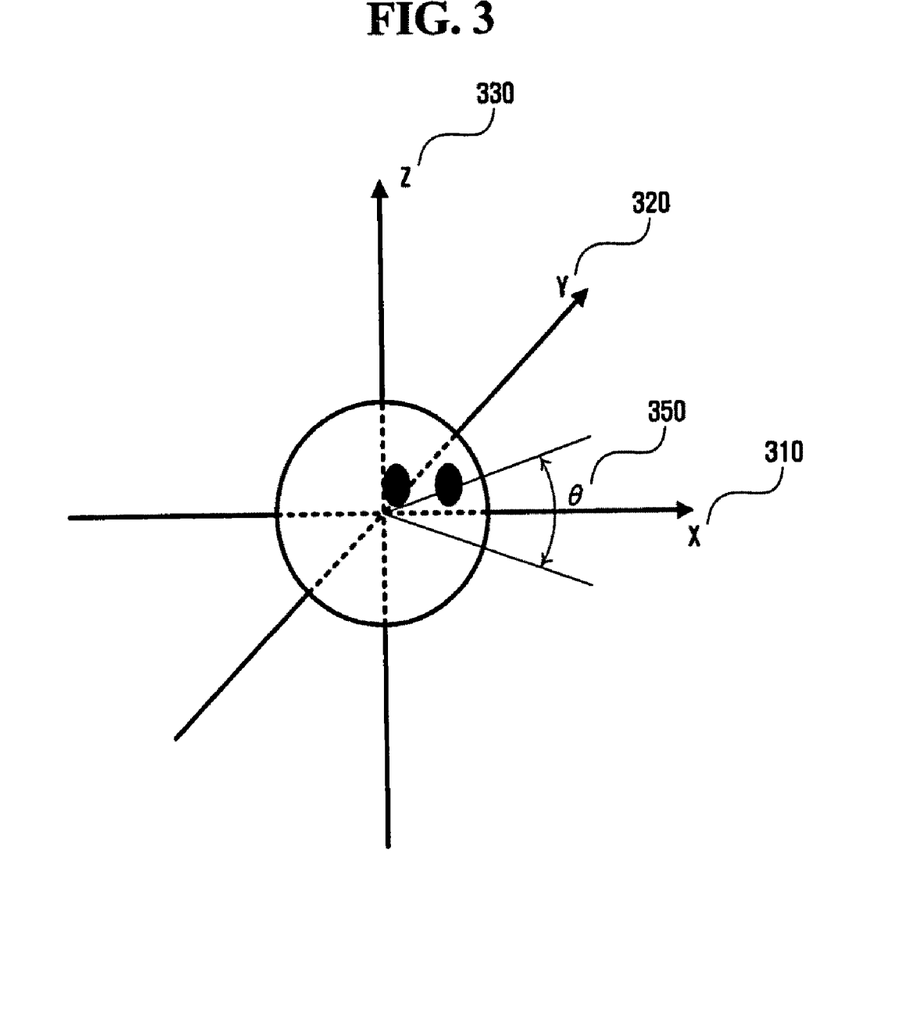
FIG. 3 conceptually shows the movement of a user in terms of spatial axes according to an exemplary embodiment.

FIG. 3 conceptually shows the movement of a user in terms of spatial axes according to an exemplary embodiment.

As mentioned above, the motion of the content display apparatus 100 includes a horizontal motion along one or a combination of three axes 310, 320, and 330 in a three-dimensional space, as well as a circular motion about one or a combination of the three axes 310, 320, and 330 in the three-dimensional space.

It will be assumed that the direction of the user's viewpoint and that of the movement of an automobile carrying the user are parallel to X-axis 310: when the automobile accelerates or decelerates, the user and the content display apparatus 100 are moved horizontally along X-axis 310; when the automobile turns left or right, they are moved horizontally along Y-axis 320; and, when the automobile moves upwards/downwards, they are moved horizontally along Z-axis 330.

The direction of movement may vary depending on the user's posture inside the automobile. If the content display apparatus 100 is in a posture towards a direction halfway between X-axis 310 and Y-axis 320, the user's viewpoint is directed in the same direction. If the automobile carrying the user moves along X-axis 310, the resulting motion of the user and the content display apparatus 100 occurs along a combination of X-axis 310 and Y-axis 320.

When the content display apparatus 100 is fastened to the user's head, as in the case of an HMD or an eyeglass-type display, the motion may be a circular motion around the user's neck. For example, if the automobile carrying the user is moving along X-axis 310 while the user's viewpoint is directed along X-axis 310, the vertical movement of the automobile causes vertical momentum of the user's head. It can be said in this case that the motion of the user's head is a circular motion around the neck within an angular range 350. Depending on the posture of the content display apparatus 100, the circular motion occurs about one or a combination of the three axes 310, 320, and 330 in the three-dimensional space.

Figure 4:
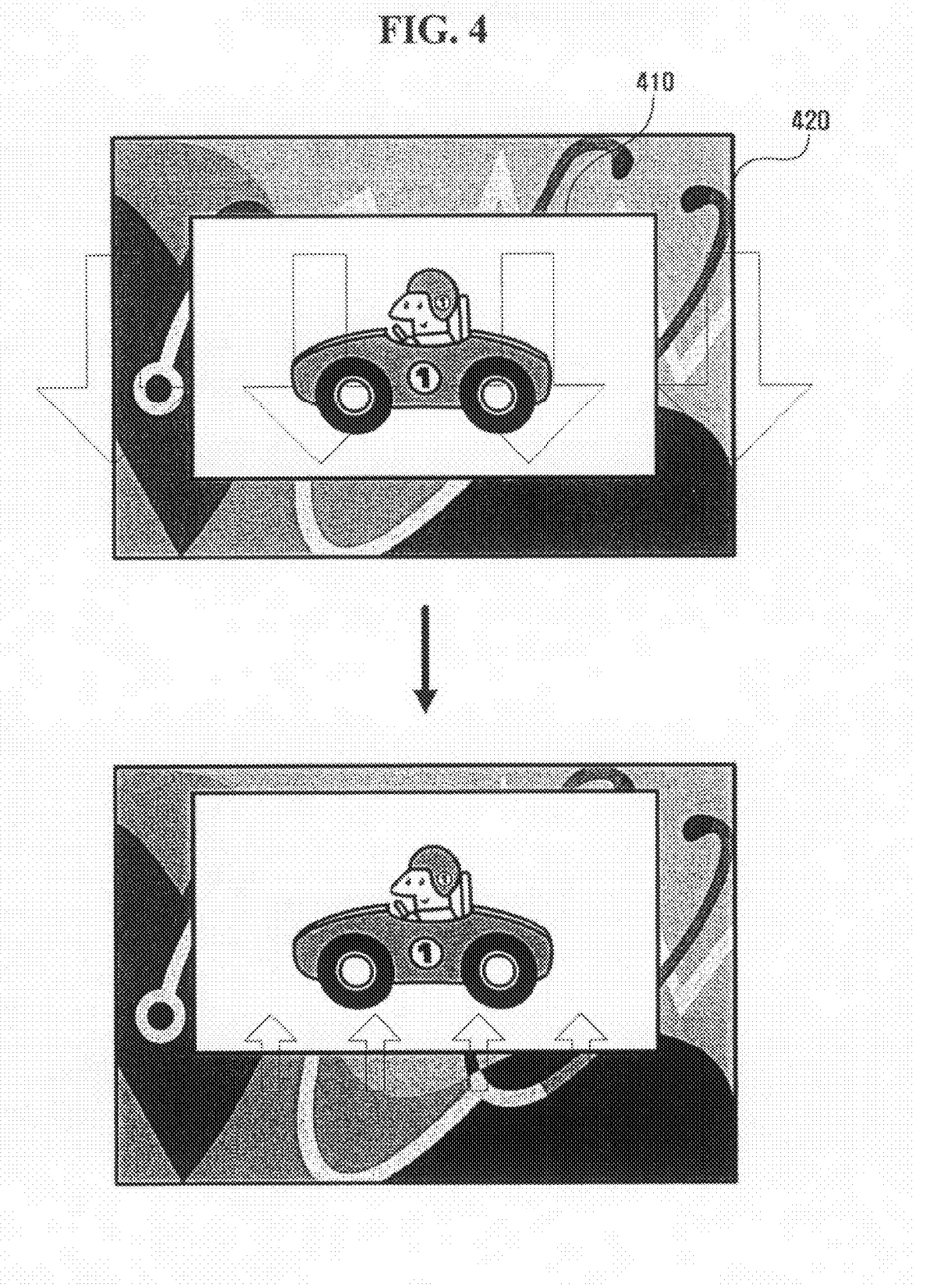
FIG. 4 shows the movement of a content image according to an exemplary embodiment.

FIG. 4 shows the movement of a content image according to an exemplary embodiment. Particularly, FIG. 4 illustrates the motion of the content image 410 according to one exemplary embodiment shown in FIG. 2.

When the content display apparatus 100 and the user receive a downward force, the content display apparatus 100 and the user's head are moved downward. Due to a VOR, the user's viewpoint is directed higher than the actual position of the content region 410. The motion sensing unit 110 senses the motion and transmits corresponding information to the display control unit 150, which then raises the position of the content region 410 without moving the background region 420, which includes the content region 410.

As such, the direction of movement of the content region 410 is synchronized with that of the user's viewpoint. Consequently, the user feels less dizzy than when the content region 410 is not moved.

Figure 5:
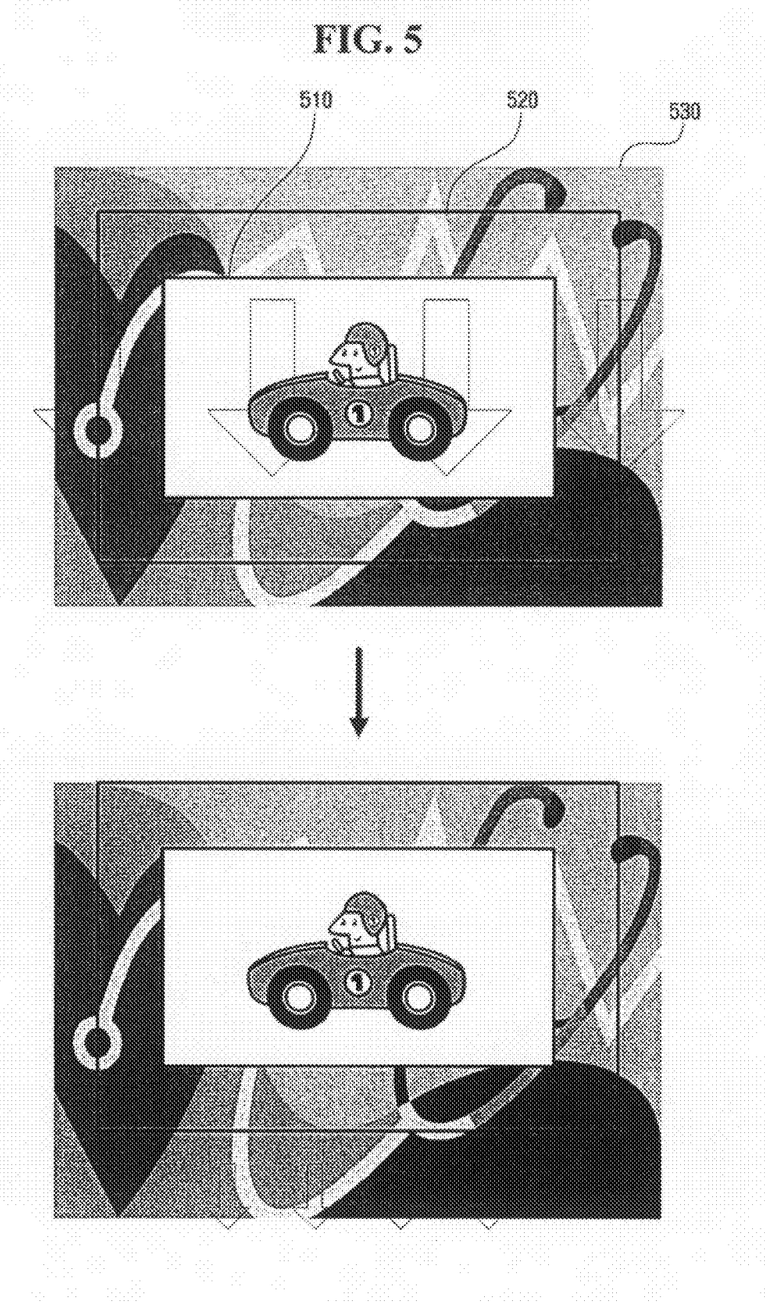
FIG. 5 shows the movement of a background image according to an exemplary embodiment.

FIG. 5 shows the movement of a background image according to an exemplary embodiment. Particularly, FIG. 5 illustrates the motion of the background image according to another exemplary embodiment shown in FIG. 2.

When the content display apparatus 100 and the user receive a downward force, the content display apparatus 100 and the user's head are moved downward. Due to a VOR, the user's viewpoint is directed higher than the actual position of the content region 510. The motion sensing unit 110 senses the motion and transmits corresponding information to the display control unit 150, which then lowers the position of the background image so that it moves further than the content display apparatus 100.

As a result, the user, who has been gazing at the content region 510 and the background region 520, recognizes that the content image is moved upwards relative to the background image 530. Then, the user's viewpoint is directed downwards.

More particularly, the upward movement of the user's viewpoint resulting from a VOR concerned with the motion of the content display apparatus 100 counterbalances the downward movement of the user's viewpoint resulting from another VOR concerned with the relative position between the content and background regions 510 and 530. Consequently, the user feels less dizzy than when the background image 530 is not moved.

The background image 530 may be any image displayed via the background region 520. The actual display region is limited by the size of the background region 520. Considering that the background image 530 may change its position according to another exemplary embodiment, the background image 530 preferably has a size larger than that of the background region 520 as shown in FIG. 5.

Although FIGS. 4 and 5 give examples of movement of the content region 410 and the background region 530, respectively, the display control unit 150 may vary the position of the image region in a combined type. For example, if the rate of a motion sensed by the motion sensing unit 110 is larger than the update rate of the content region 410, or if the size of the motion is larger than the available distance of movement of the content region 410, the display control unit 150 moves both the content region 410 and the background image 530.

Figure 6:
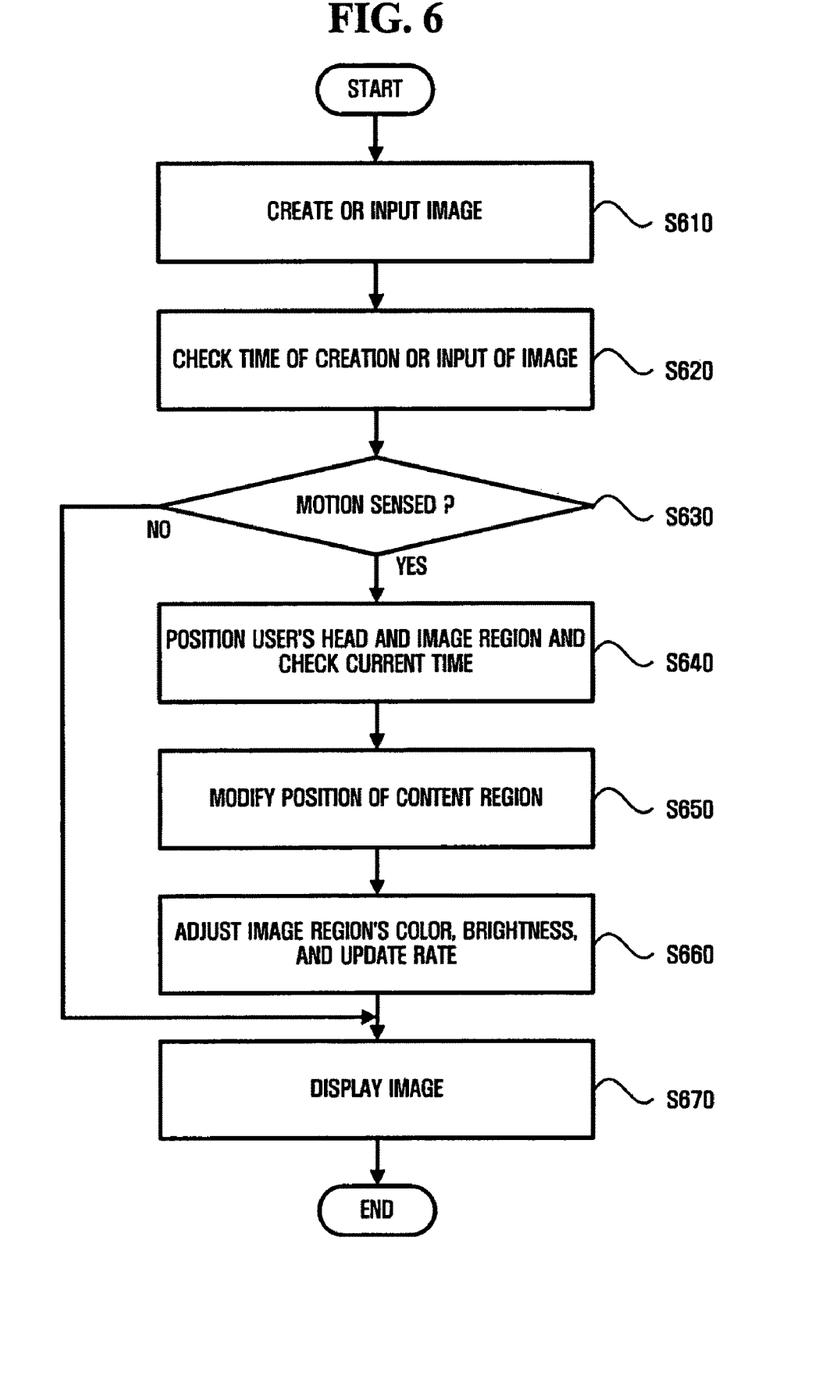
FIG. 6 is a flowchart showing steps for moving a content image according to an exemplary embodiment.

FIG. 6 is a flowchart showing steps for moving a content image according to an exemplary embodiment.

In order to move the content image based on a sensed motion, the content and background image creation units 140 and 160 of the content display apparatus 100 create content and background images, respectively (S610). Alternatively, the content and background images may be inputted via predetermined input unit (S610). The display control unit 150 checks the time of creation or input of the content and background images (S620).

When the motion sensing unit 110 senses a motion (S630), the user and image positioning units 120 and 130 position the user's head and the image region, respectively, and check the current time (S640).

The user and image positioning units 120 and 130 transmit resulting information to the display control unit 150, which then modifies the position of the content region (S650). Particularly, the display control unit 150 moves the content region in a direction opposite to the direction of the sensed motion. The modification of position of the content region is based on the difference between the time of creation or input of the content and background images and the time at which the motion has been sensed.

The display control unit 150 may adjust the color and brightness of the image region and the movement update rate of the content region with reference to the size of the motion sensed by the motion sensed unit 110 (S660).

The display unit 170 displays the image region including the content region, which has changed its position (S670).

Figure 7:
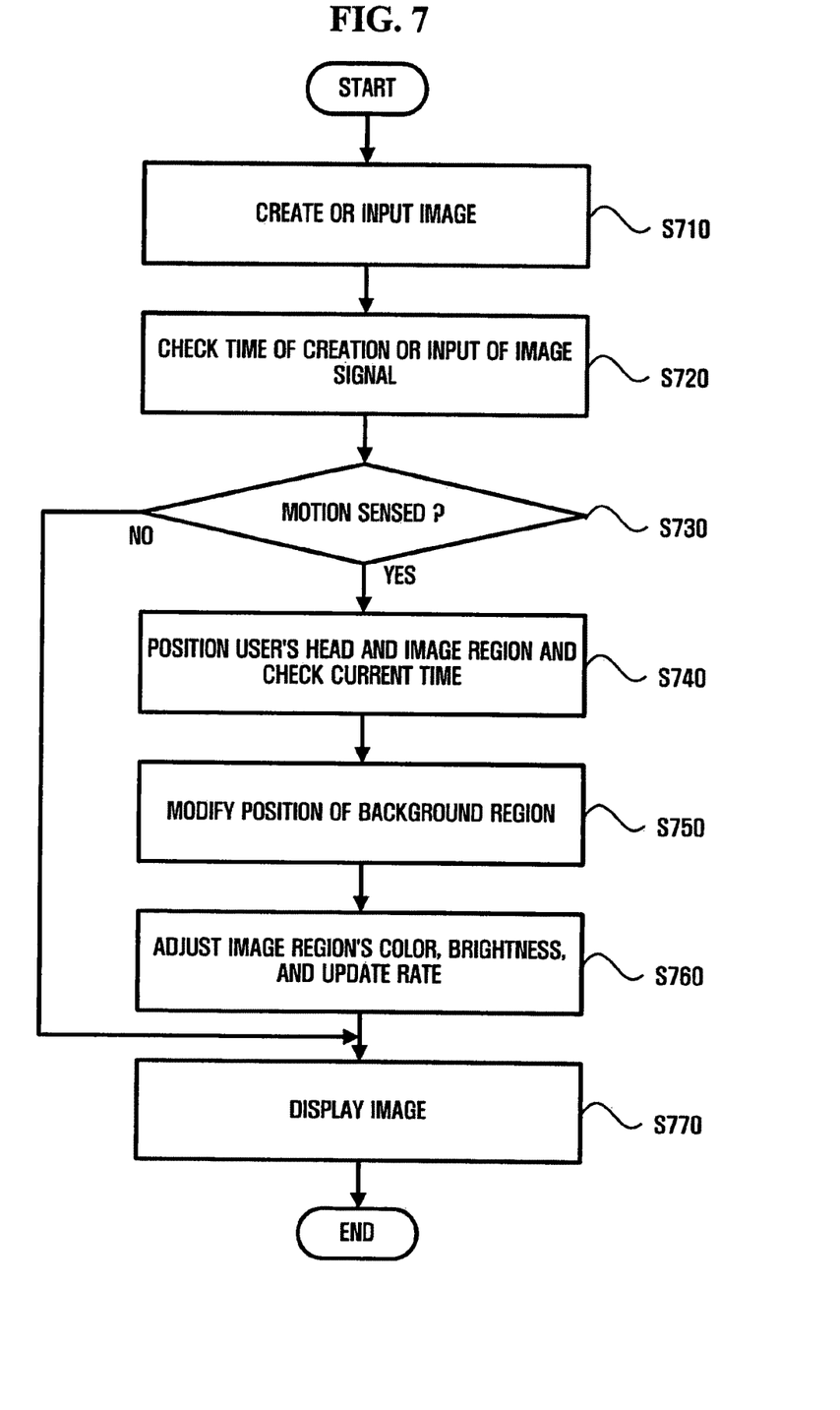
FIG. 7 is a flowchart showing steps for moving a background image according to an exemplary embodiment.

FIG. 7 is a flowchart showing steps for moving a background image according to an exemplary embodiment.

In order to move the background image based on a sensed motion, the content and background image creation units 140 and 160 of the content display apparatus 100 create content and background images, respectively (S710). Alternatively, the content and background images may be inputted via predetermined input unit (S710). The display control unit 150 checks the time of creation or input of the content and background images (S720).

When the motion sensing unit 110 senses a motion (S730), the user and image positioning units 120 and 130 position the user's head and the image region, respectively, and check the current time (S740).

The user and image positioning units 120 and 130 transmit resulting information to the display control unit 150, which then modifies the position of the background region (S750). Particularly, the display control unit 150 moves the background region in the same direction as the sensed motion. The modification of position of the background region is based on the difference between the time of creation or input of the content and background images and the time at which the motion has been sensed. The degree of movement of the background image is larger than that of the content display apparatus 100.

The display control unit 150 may adjust the color and brightness of the image region and the movement update rate of the content region with reference to the size of the motion sensed by the motion sensed unit 110 (S760).

The display unit 170 displays the image region including the background region, which has changed its position (S770).

In addition to the above-described exemplary embodiments, exemplary embodiments can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

As mentioned above, an apparatus, a method, and a medium for displaying contents based on motions according to exemplary embodiments are advantageous in that, by identifying the direction of a sensed motion and moving the content region in a direction opposite to the direction of the sensed motion or moving the background in the direction of the sensed motion, dizziness resulting from a VOR lessens.

Although a few exemplary embodiments have been shown and described, it would be appreciated by those skilled in the art that changes may be made in these exemplary embodiments, the scope of which is defined in the claims and their equivalents.

What is claimed is:

1. An apparatus for displaying an image according to a motion, the apparatus comprising:
   a motion sensing unit to sense a motion of a user;
   a display control unit to adjust a position of an image region comprising the image with reference to a direction of the sensed motion; and
   a display unit to display a content and a background according to the adjusted position, wherein the image region comprises a content region having the content and a background region having the background,
   wherein the motion of the user is reflected in the background image.

2. The apparatus of claim 1, wherein the content region is contained in the background region.

3. The apparatus of claim 1, wherein the display control unit is adapted to adjust the position of the image region with reference to a difference between time of input of the content and time of sensing the motion.

4. The apparatus of claim 1, wherein the display control unit is adapted to adjust the position of the image region with reference to a difference between time of input of the background and time of sensing of the motion.

5. The apparatus of claim 1, wherein the display control unit is adapted to adjust a position of the content region in a direction opposite to the direction of the motion.

6. The apparatus of claim 1, wherein the display control unit is adapted to adjust a position of the background region in the direction of the motion.

7. The apparatus of claim 1, wherein the motion comprises a horizontal motion along one or a combination of three axes in a three-dimensional space.

8. The apparatus of claim 1, wherein the motion comprises a circular motion about one or a combination of three axes in a three-dimensional space.

9. The apparatus of claim 1, wherein the display control unit is adapted to adjust color, brightness, and update rate of the image region with reference to size and rate of the motion.

10. The apparatus of claim 1, wherein the display control unit is adapted to adjust both a position of the content region and a position of the background when the motion has a size larger than an available operation radius and a rate larger than an update rate of the content region.

11. A method of displaying an image according to a motion, the method comprising:
    sensing a motion of a user;
    adjusting a position of an image region with reference to a direction of the sensed motion using a processor; and
    displaying a content and a background according to the adjusted position, wherein the image region comprises a content region having the content and a background region having the background,
    wherein the motion of the user is reflected in the background image.

12. The method of claim 11, wherein the content region is contained in the background region.

13. The method of claim 11, wherein the adjusting the position of the image region is performed with reference to a difference between time of input of the content and time of sensing of the motion.

14. The method of claim 11, wherein the adjusting the position of the image region is performed with reference to a difference between time of input of the background and time of sensing of the motion.

15. The method of claim 11, wherein the adjusting the position of the image region comprises adjusting a position of the content region in a direction opposite to the direction of the motion.

16. The method of claim 11, wherein the adjusting the position of the image region comprises adjusting a position of the background in the direction of the motion.

17. The method of claim 11, wherein the motion comprises a horizontal motion along one or a combination of three axes in a three-dimensional space.

18. The method of claim 11, wherein the motion comprises a circular motion about one or a combination of three axes in a three-dimensional space.

19. The method of claim 11, wherein the adjusting the position of the image region comprises adjusting color, brightness, and update rate of the image region with reference to size and rate of the motion.

20. The method of claim 11, wherein the adjusting the position of the image region comprises adjusting both a position of the content region and a position of the background when the motion has a size larger than an available operation radius and a rate larger than an update rate of the content region.

21. At least one computer readable medium storing computer readable instructions that control at least one processor to implement the method of claim 11.

22. An apparatus for displaying an image according to a motion, the apparatus comprising:
    a display controller to adjust a position of an image region comprising the image with reference to a direction of sensed motion of a user for displaying the image; and
    a display to display a content and a background according to the adjusted position, wherein the image region comprises a content region having the content and a background region having the background,
    wherein the motion of the user is reflected in the background image.

23. The apparatus of claim 22, wherein the display control unit is adapted to adjust a position of the content region in a direction opposite to the direction of the motion.

24. The apparatus of claim 22, wherein the display control unit is adapted to adjust a position of the background region in the direction of the motion.

25. The apparatus of claim 22, further comprising a motion sensor to sense the motion of the apparatus for displaying the image.

* * * * *